United States Patent
Ahn et al.

(10) Patent No.: US 8,615,868 B2
(45) Date of Patent: Dec. 31, 2013

(54) METHOD FOR MANUFACTURING A MAGNETIC SENSOR USING TWO STEP ION MILLING

(75) Inventors: Yongchul Ahn, San Jose, CA (US); Xiaozhong Dang, Fremont, CA (US); Quang Le, San Jose, CA (US); Simon H. Liao, Fremont, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/306,887

(22) Filed: Nov. 29, 2011

(65) Prior Publication Data

US 2013/0135772 A1    May 30, 2013

(51) Int. Cl.
*G11B 5/127*   (2006.01)
*H04R 31/00*   (2006.01)

(52) U.S. Cl.
USPC ............. 29/603.16; 29/603.12; 29/603.13; 29/603.14; 29/603.15; 29/603.18; 216/62; 216/65; 216/66; 360/324.1; 360/324.11; 360/324.12; 360/324.2; 451/5; 451/41

(58) Field of Classification Search
USPC ............ 29/603.07, 603.13–603.16, 603.18; 216/62, 65, 66; 360/324.1, 324.2, 360/324.11, 324.12; 427/127–131
See application file for complete search history.

(56) References Cited

U.S. PATENT DOCUMENTS

| | | | |
|---|---|---|---|
| 5,650,958 A | 7/1997 | Gallagher et al. | |
| 6,297,983 B1 | 10/2001 | Bhattacharyya | |
| 6,485,989 B1 | 11/2002 | Signorini | |
| 6,762,915 B2 | 7/2004 | Pokhil et al. | |
| 7,112,454 B2 | 9/2006 | Drewes et al. | |
| 7,382,589 B2 | 6/2008 | Lin et al. | |
| 7,639,456 B2 | 12/2009 | Hong et al. | |
| 7,645,618 B2 | 1/2010 | Ditizio | |
| 7,859,799 B2 | 12/2010 | Watanabe et al. | |
| 2006/0094129 A1* | 5/2006 | Pinarbasi | 438/3 |
| 2010/0178714 A1 | 7/2010 | Cho et al. | |

FOREIGN PATENT DOCUMENTS

JP    2006/165031 A    6/2006

OTHER PUBLICATIONS

Persson et al., "Etch-stop technique for patterning of tunnel junctions for a magnetic field sensor," 2011 IOP Publishing Ltd., Journal of Micromechanics and Microengineering, vol. 21, pp. 1-8.
Takahashi et al., "Ion-Beam Etched Profile Control of MTJ Cells for Improving the Switching Characteristics of High-Density MRAM," 2006 IEEE, IEEE Transactions on Magnetics, vol. 42, No. 10, Oct. 2006, pp. 2745-2747.

* cited by examiner

*Primary Examiner* — Paul D Kim
(74) *Attorney, Agent, or Firm* — Zilka-Kotab, PC

(57) ABSTRACT

A method for manufacturing a magnetic sensor that includes depositing a plurality of mask layers, then forming a stripe height defining mask over the sensor layers. A first ion milling is performed just sufficiently to remove portions of the free layer that are not protected by the stripe height defining mask, the first ion milling being terminated at the non-magnetic barrier or spacer layer. A dielectric layer is then deposited, preferably by ion beam deposition. A second ion milling is then performed to remove portions of the pinned layer structure that are not protected by the mask, the free layer being protected during the second ion milling by the dielectric layer.

15 Claims, 11 Drawing Sheets

METHOD FOR MANUFACTURING A MAGNETIC SENSOR USING TWO STEP ION MILLING

FIELD OF THE INVENTION

The present invention relates to magnetic data recording and more particularly to a magnetic read head wherein the free layer is protected during stripe height defining ion milling for improved sensor performance and stripe height definition.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When a current flows through the coil, a resulting magnetic field causes a magnetic flux to flow through the write pole, which results in a magnetic write field emitting from the tip of the write pole. This magnetic field is sufficiently strong that it locally magnetizes a portion of the adjacent magnetic disk, thereby recording a bit of data. The write field, then, travels through a magnetically soft underlayer of the magnetic medium to return to the return pole of the write head.

A magnetoresistive sensor such as a Giant Magnetoresistive (GMR) sensor, or a Tunnel Junction Magnetoresisive (TMR) sensor can be employed to read a magnetic signal from the magnetic media. The sensor includes a nonmagnetic conductive layer (if the sensor is a GMR sensor) or a thin nonmagnetic, electrically insulating barrier layer (if the sensor is a TMR sensor) sandwiched between first and second ferromagnetic layers, hereinafter referred to as a pinned layer and a free layer. Magnetic shields are positioned above and below the sensor stack and can also serve as first and second electrical leads so that the electrical current travels perpendicularly to the plane of the free layer, spacer layer and pinned layer (current perpendicular to the plane (CPP) mode of operation). The magnetization direction of the pinned layer is pinned perpendicular to the air bearing surface (ABS) and the magnetization direction of the free layer is located parallel to the ABS, but free to rotate in response to external magnetic fields. The magnetization of the pinned layer is typically pinned by exchange coupling with an antiferromagnetic layer.

When the magnetizations of the pinned and free layers are parallel with respect to one another, scattering of the conduction electrons is minimized and when the magnetizations of the pinned and free layer are antiparallel, scattering is maximized. In a read mode the resistance of the spin valve sensor changes about linearly with the magnitudes of the magnetic fields from the rotating disk. When a sense current is conducted through the spin valve sensor, resistance changes cause potential changes that are detected and processed as playback signals.

SUMMARY OF THE INVENTION

The present invention provides a method for manufacturing a magnetic sensor that includes forming a magnetic shield and depositing a series of sensor layers, the series of sensor layers including a magnetic pinned layer structure a non-magnetic layer formed over the pinned layer structure and a magnetic free layer structure formed over the non-magnetic layer. A mask is formed over the series of sensor layers, the mask being configured to define a stripe height of the magnetic sensor. A first ion milling is then performed, the first ion milling being terminated when the non-magnetic layer of the series of sensor layers has been reached. A layer of dielectric material is then deposited; and second ion milling is performed.

The present invention forms a magnetic sensor that includes a magnetic pinned layer structure, a magnetic free layer structure, and a non-magnetic layer sandwiched between the magnetic pinned layer structure and the magnetic free layer structure. The magnetic free layer terminates at a back edge that is located a first distance from an air bearing surface, and the magnetic pinned layer structure terminates at a back edge that is located a second distance from the air bearing surface. The sensor also includes a dielectric spacer layer located at the back edge of the magnetic free layer.

The dielectric layer advantageously protects the free layer and barrier layer during the subsequent second ion milling. This prevents damage to the free layer and also to the barrier layer. In addition, the dielectric layer acts as a diffusion barrier to prevent diffusion of oxygen into the barrier layer or free layer. The dielectric layer also advantageously forms a non-magnetic spacer that allows the stripe height of the sensor to be defined by the stripe height of the free layer, but provides additional pinning robustness by allowing the pinned layer to extend beyond the free layer in the stripe height direction.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
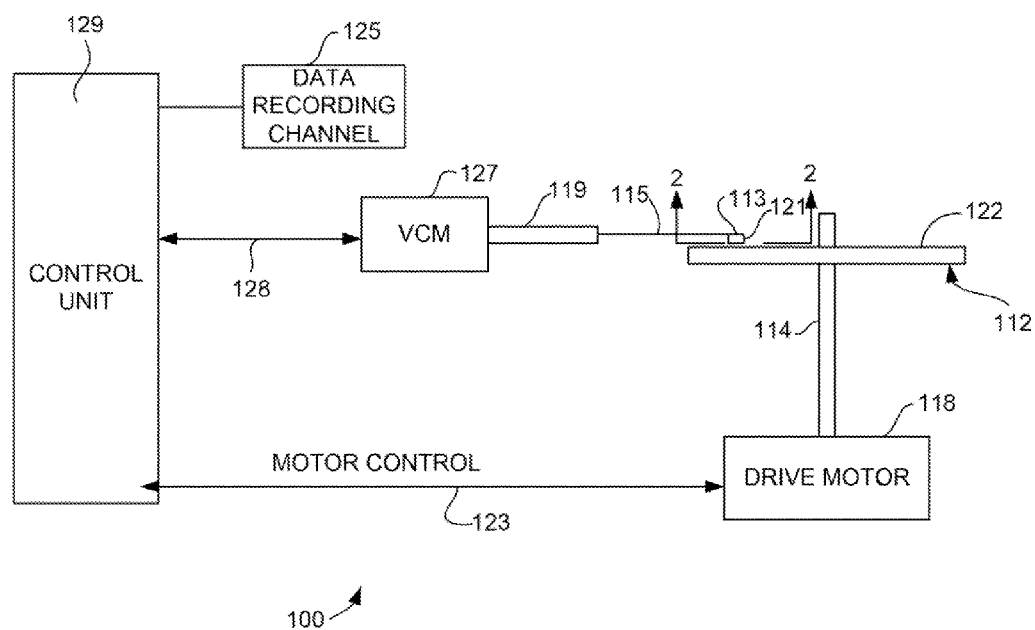
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
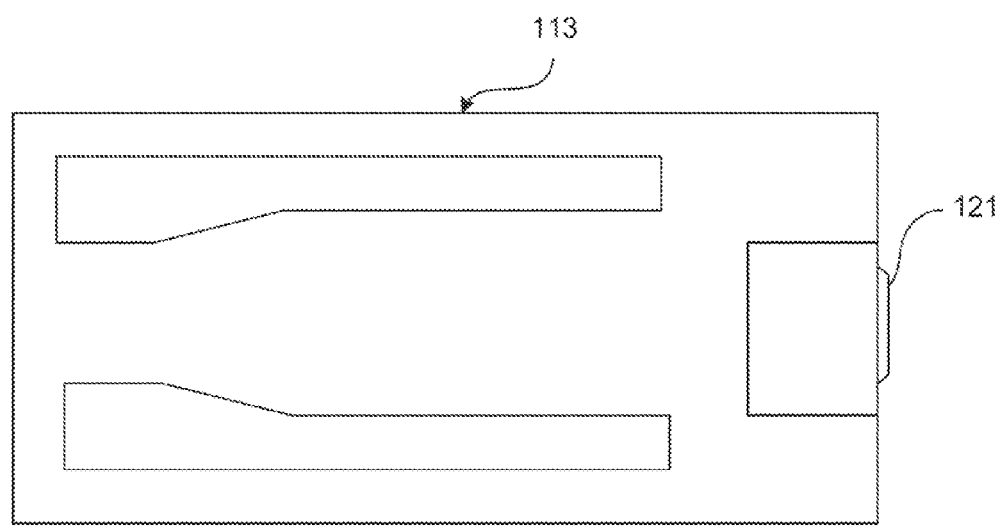
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system and the accompanying illustration of FIG. 1 are for representation purposes only. It should be apparent that disk storage systems may contain a large number of disks and actuators, and each actuator may support a number of sliders.

Figure 3:
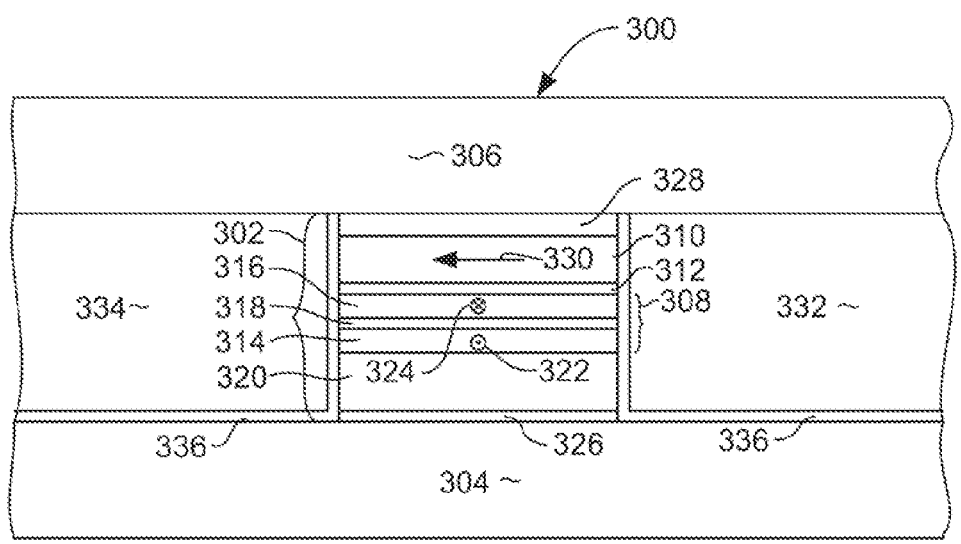
FIG. 3 is an ABS view of a magnetoresistive sensor according to an embodiment of the invention.

FIG. 3 shows a magnetic read head 300 having a sensor stack 320 that is sandwiched between first and second magnetic shields 304, 306. The magnetic shields 304, 306 can be constructed of an electrically conductive, magnetic material such as NiFe so that they can function as electrical leads for supplying a sense current to the sensor stack 320 as well as functioning as magnetic shields. The sensor stack can include a magnetic pinned layer structure 308, a magnetic free layer 310 and a non-magnetic barrier or spacer layer 312 sandwiched there-between. The sensor stack 302 can also include a seed layer 326 at its bottom, which can be provided to ensure a desired grain structure formation in the above deposited layers. The sensor stack 302 can also include a capping layer 328 at its top to protect the under-lying layers from damage during manufacture.

The pinned layer structure can include first and second magnetic layers 314, 316 that are anti-parallel coupled across a non-magnetic antiparallel coupling layer 318, which can be constructed of Ru and can have a thickness of about 4-6 Angstroms or about 4.3 Angstroms. The first magnetic layer 314 can be exchange coupled with a layer of antiferromagnetic material (AFM layer) 320, which can be a material such as IrMn having a thickness of about 60 Angstroms. This exchange coupling strongly pins the magnetization of first magnetic layer 310 in a first direction perpendicular to the ABS as indicated by arrowhead symbol 322. Anti-parallel coupling between the magnetic layers 314, 316 pins the magnetization of the second magnetic layer 324 in a second direction that is anti-parallel with the first direction and perpendicular to the ABS as indicated by arrow-tail symbol 324.

The free layer 310 has a magnetization that is biased in a direction that is generally parallel with the ABS as indicated by arrow 330. Although the magnetization 330 is biased in this direction, it is free to move in response to an external magnetic field, such as from a magnetic medium.

The biasing of the magnetization 330 is achieved by a magnetic bias field from hard magnetic bias layers 332, 334. These magnetic bias layers 332, 334 are permanent magnets formed of a high coercivity magnetic material such as CoPt, or CoPtCr. The bias layers 332, 334 are separated from the sensor stack 302 and from at least the bottom shield 304 by a thin layer of non-magnetic, electrically insulating layers such as alumina 336, 338.

Figure 4:
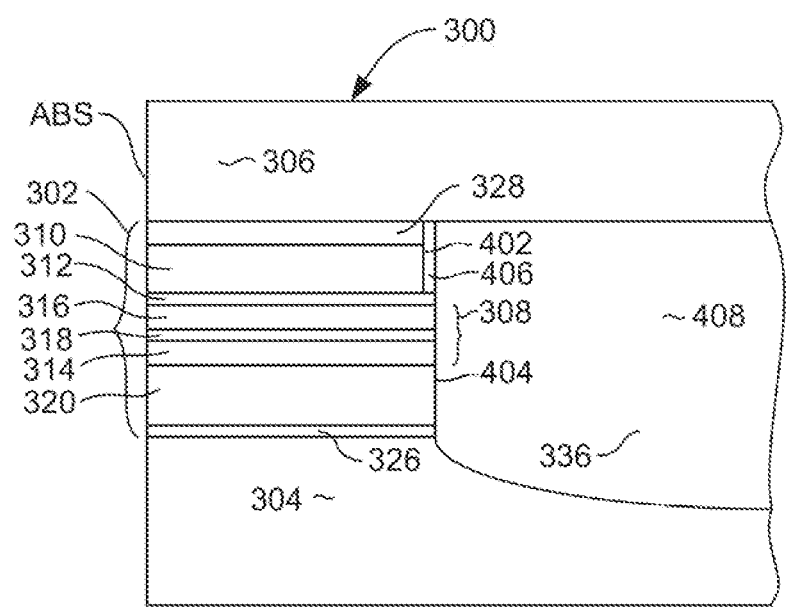

FIG. 4 shows a side view of the magnetic head of FIG. 3. As seen in FIG. 4, the free layer extends to a first back edge portion 402 that extends a first distance from the ABS, whereas the pinned layer structure 308 and AFM layer 320 extend to a second back edge portion 404 that extends to a second distance from the ABS that is greater than the first distance. That is, the pinned layer structure 308 and AFM extend further from the AFM than the free layer 310 and capping layer 328 do.

Therefore, the back edge (stripe height) of the sensor 300 has a stepped structure defined by the two back edges 402, 404. The head 300 includes a non-magnetic, electrically insulating spacer layer 406, formed at the back edge 402 to provide and define this stepped configuration. A non-magnetic, electrically insulating fill material 408 fills the space beyond the sensor stack 302 between the shields 304, 306. The spacer layer 402 can be alumina or can be some other dielectric material. Similarly, the fill material 408 can also be alumina. The back edge of the non-magnetic spacer layer 402 is aligned with the back edge 404 of the pinned layer structure 308 and AFM 320.

Figure 5:
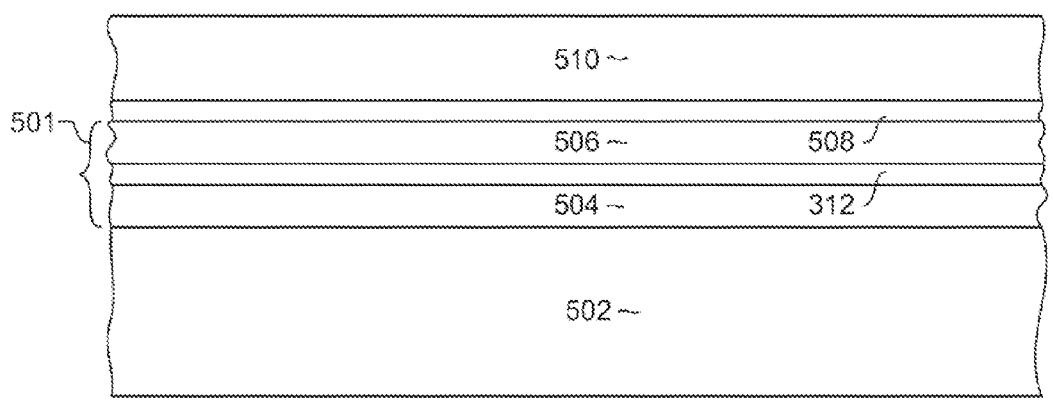
FIG. 5 is a side view of the magnetoresistive sensor of FIG. 3.

FIGS. 5-10 illustrate a method for manufacturing a magnetic sensor according to an embodiment of the invention. With particular reference to FIG. 5, a first electrically conductive, magnetic shield 502 is formed. This magnetic shield can be a material such as NiFe. Then, a plurality of sensor layers 501 are deposited over the shield. For purposes of clarity, the layers listed collectively 504 in FIG. 5 refer to the seed layer 326, AFM layer (or pinning layer) 320, and pinned layer structure 308 described above with reference to FIG. 3. The layers 506 refer to the free layer 310 and capping layer 328 described above with reference to FIG. 3, and layer 312 in FIG. 5 is the non-magnetic barrier layer 312 described above with reference to FIG. 3.

With continued reference to FIG. 5, a CMP stop layer 508, constructed of material such as Diamond-Like Carbon (DLC) that is resistant to chemical mechanical polishing, is deposited over the sensor layers 501. Then, a mask layer 510 is deposited over the CMP stop layer 508. The mask layer 510 includes a resist material, but might also include other materials, not shown, such as a hard mask layer a Bottom Anti-Reflective Coating layer (BARC) and/or an image transfer layer such as DURIMIDE®.

Figure 6:
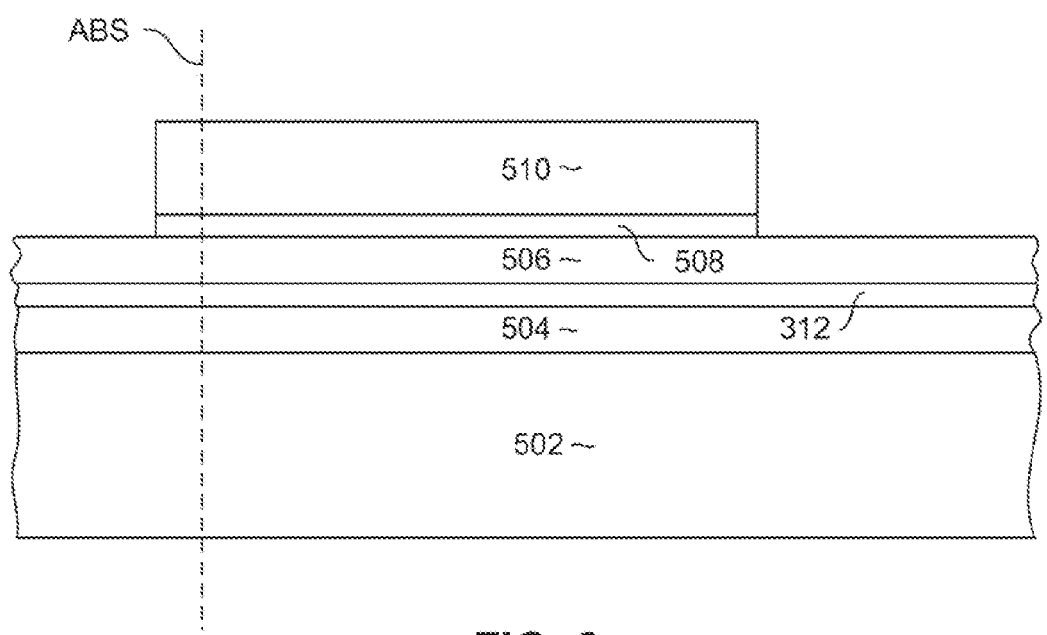
FIGS. 6-11 are views of a sensor in various intermediate stages of manufacture, illustrating a method for manufacturing a magnetic sensor according to an embodiment of the invention.

With reference now to FIG. 6, a lithographic patterning process is performed to form the mask layer 510 and CMP stop layer 508 into a stripe height defining mask structure. The location of the air bearing surface plane is indicated by the dashed line labeled ABS in order to more clearly illustrate the orientation of the view of FIG. 6 and to indicated that the mask 510 and CMP stop layer 508 are configured to define a back edge or stripe height of the sensor (as opposed to a track-width).

Figure 7:
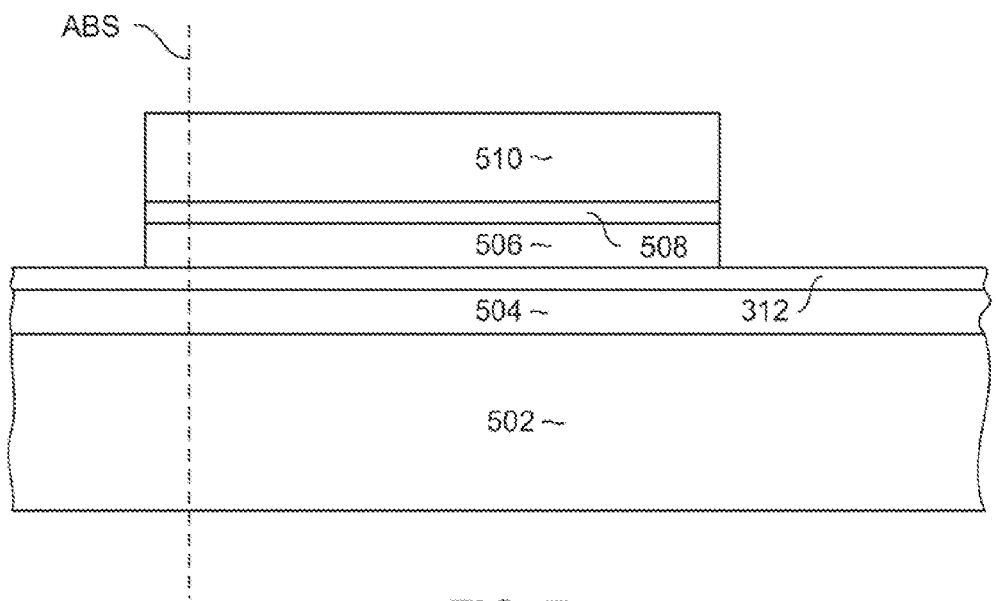

After defining the mask layer 510 as described above, a first ion milling is performed to remove portions of the top set of sensor layers 506 that are not protected by the mask 510, leaving a structure as shown in FIG. 7. This first ion milling is terminated when the barrier layer 312 is reached, either before removing any significant amount of the barrier layer 312, immediately after removing the barrier layer 312 or somewhere in between. An end point detection method such as Secondary Ion Mass Spectrometry (SIMS) can be used to determine when the barrier layer 312 has been reached and when this first ion milling process should be terminated. This first ion milling is performed with rotation (that is on a wafer that is held on a rotating chuck (not shown)). The ion milling is preferably performed at an angle of 5 degrees or less relative to normal.

Figure 8:
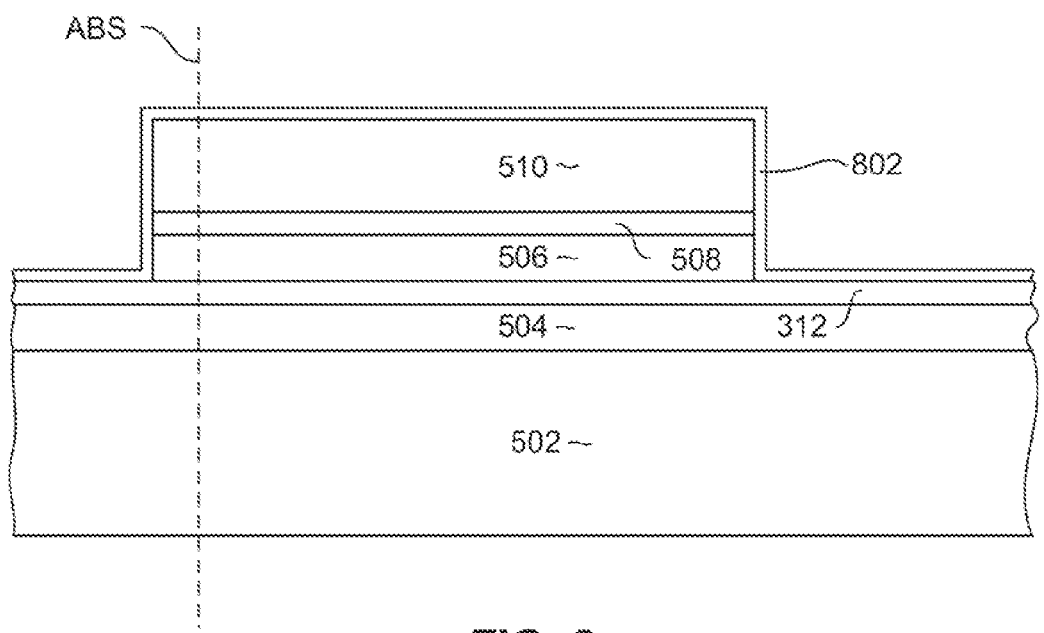

Then, after performing this first ion milling process, with reference to FIG. 8 a layer of non-magnetic, dielectric material 802 is deposited. This material can be a material such as alumina, SiNx, MgO or SiOxNy and is preferably deposited by Ion Beam Deposition, although it could be some other dielectric material. The dielectric layer 802 is preferably deposited to a thickness of about 10 nm or less, or about 10 nm. The thickness of the side wall will determine the amount by which the pinned layer structure 308 extends beyond the free layer 310 in the stripe height direction as shown in FIG. 4. The thickness of the deposited dielectric layer 802 can vary by as much as 60% over the wafer, such as in the field regions, and it should also be noted that depositing the dielectric layer 308 too thick can result in difficulties with mask liftoff and CMP processes (which will be described herein below).

Figure 9:
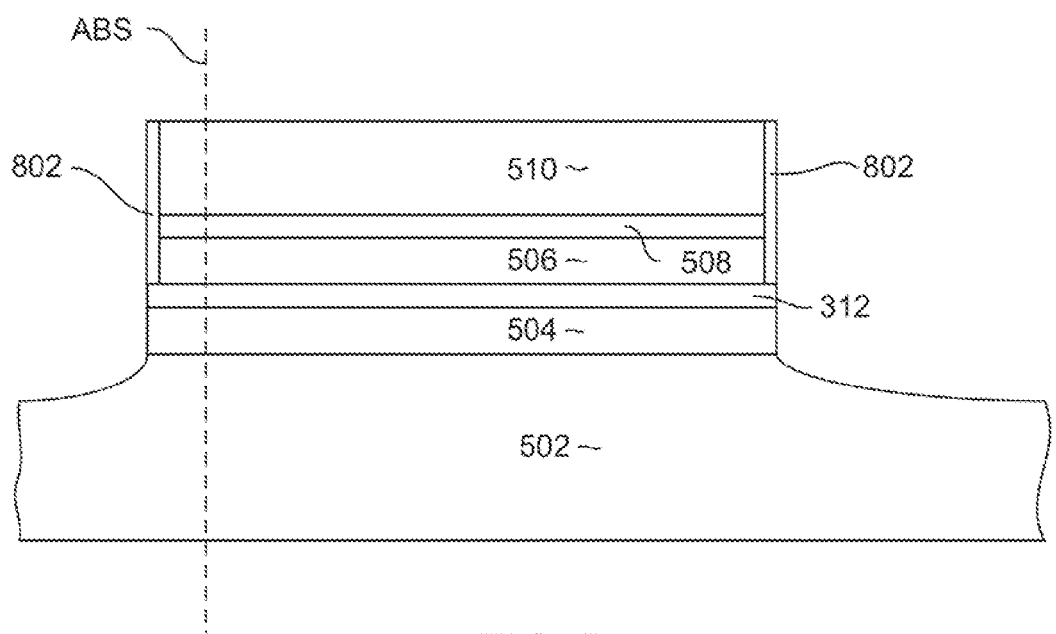

Then, with reference to FIG. 9 a second ion milling is performed to remove the rest of the sensor layers 504 that are not protected by the mask 510. The second ion milling removes horizontally disposed portion of the dielectric layer 802, leaving vertical sidewalls of dielectric material 802 formed at the sides of the upper sensor layers 506 as shown in FIG. 9. Also, as can be seen, the outer edge of each of the dielectric side walls 802 are aligned with the outer edge of the lower sensor layers 504 and barrier layer 312 (if the barrier layer 312 was not removed in the previous first ion milling). The second ion milling is performed until the bottom shield 502 has been reached and can also be continued to remove a portion of the bottom shield 502 as shown in FIG. 9. The second ion milling can be performed at an angle of 0 to 20 degrees relative to normal.

The dielectric layer 802 advantageously protects the sides of the barrier layer 312 and the free layer 310 (FIG. 4) from damage during this second ion milling. The dielectric layer 802 also acts as an effective diffusion barrier to prevent the diffusion of oxygen into the barrier layer 310 (FIG. 4) and/or the barrier or spacer layer 312.

Figure 10:
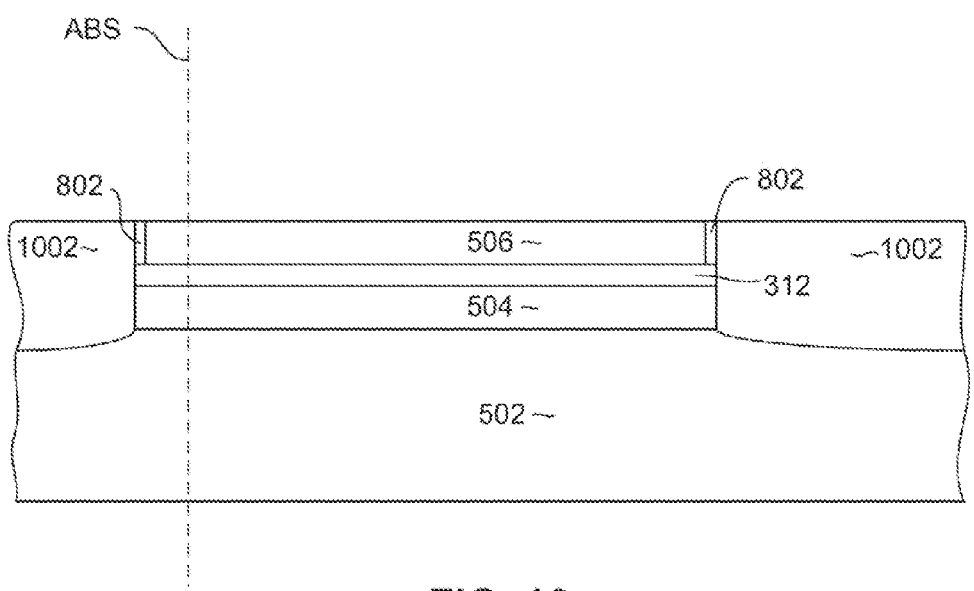
Figure 11:
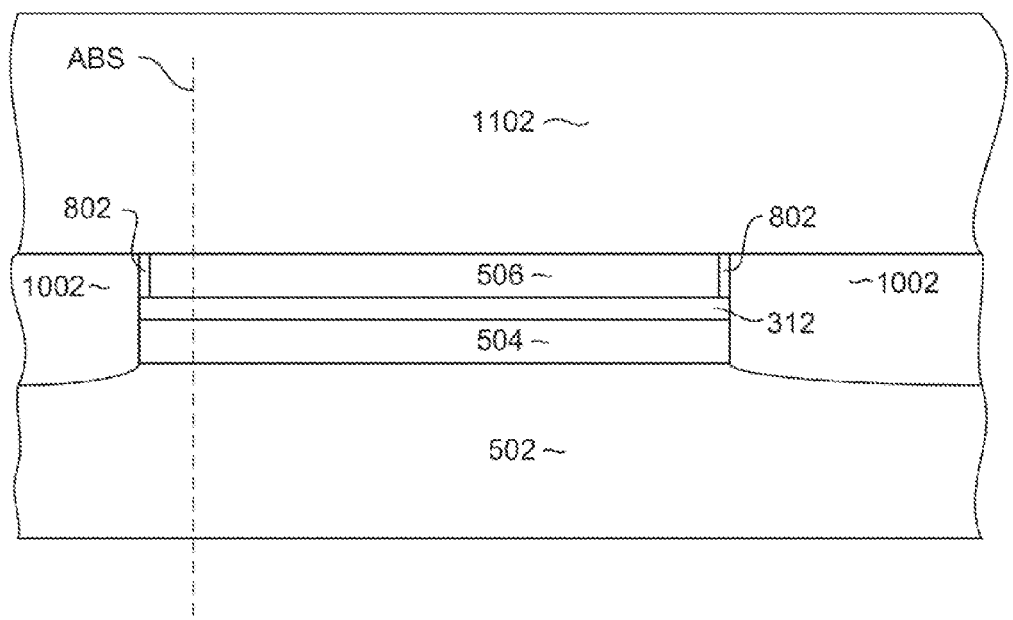

Then, a non-magnetic, electrically insulating fill layer such as alumina 1002 is deposited, wherein the dielectric material and the non-magnetic, electrically insulating fill layer can be different materials. A series of liftoff and planarization process can then be performed which can include wrinkle bake or high angle ion milling, a liftoff process such as a chemical liftoff to remove the mask 512, a chemical mechanical polishing process for planarization, and a reactive ion etching (RIE) to remove the CMP stop layer 508. This leaves a structure as shown in FIG. 10. Then, with reference to FIG. 11, an upper magnetic, electrically conductive shield 1102 can be formed, such as by electroplating a material such as NiFe.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic sensor, comprising:
    forming a magnetic shield;
    depositing a series of sensor layers, the series of sensor layers including a magnetic pinned layer structure, a non-magnetic layer formed over the pinned layer structure and a magnetic free layer structure formed over the non-magnetic layer;
    forming a mask or the series of sensor layers, the mask being configured to define a stripe eight of the magnetic sensor;
    performing a first ion milling, the first ion milling being terminated when the non-magnetic magnetic layer of the series of sensor layers has been reached;
    depositing a layer of dielectric material; and
    performing a second ion milling, wherein the second ion milling is performed until the magnetic shield has been reached.

2. The method as in claim 1, further comprising, after performing the second ion milling, depositing a non-magnetic, electrically insulating fill layer.

3. The method as in claim 1 wherein the dielectric layer comprises alumina.

4. The method as in claim 1 wherein the dielectric layer comprises alumina, SiNx, MgO or SiOxNy.

5. The method as in claim 1 wherein the dielectric layer is deposited to a thickness of about 10 nm.

6. The method as in claim 1 wherein the dielectric layer is deposited to a thickness not greater than 10 nm.

7. The method as in claim 1 wherein the dielectric layer comprises alumina, SiNx, MgO or SiOxNy and is deposited to a thickness of about 10 nm.

8. The method as in claim 1 wherein the dielectric layer comprises alumina, SiNx, MgO or SiOxNy and is deposited to a thickness not greater than 10 nm.

9. The method as in claim 1 wherein the first ion milling is performed at an angle of 5 degrees or less relative to normal.

10. The method as in claim 1 wherein the series of sensor layers further comprises a capping layer formed over the magnetic free layer and wherein the first ion milling removes portions of the capping layer and the free layer that are not protected by the mask.

11. A method for manufacturing a magnetic sensor, comprising:
   forming a magnetic shield;
   depositing a series of sensor layers, the series of sensor layers including a magnetic pinned layer structure, a non-magnetic layer formed over the pinned layer structure and a magnetic free layer structure formed over the non-magnetic layer;
   depositing a CMP stop layer over the series of sensor layers
   forming a mask over the series of sensor layers, the mask being configured to define a stripe height of the magnetic sensor;
   performing a first ion milling, the first ion milling being terminated when the non-magnetic layer of the series of sensor layers has been reached;
   depositing a layer of dielectric material;
   performing a second ion milling;
   after performing the second ion milling, depositing a non-magnetic fill layer;
   performing a chemical mechanical polishing; and
   performing a reactive ion etching to remove the CMP stop layer.

12. The method as in claim 1 further comprising, after performing the second ion milling, depositing a non-magnetic, electrically insulating fill layer, wherein the dielectric material and the non-magnetic, electrically insulating fill layer are different materials.

13. The method as in claim 1 further comprising, after performing the second ion milling, depositing a non-magnetic, electrically insulating fill layer, wherein the dielectric material and the non-magnetic, electrically insulating fill layer are separately distinguishable layers of the same material.

14. The method as in claim 1 wherein the second ion milling removes horizontally disposed portions of the dielectric layer, leaving dielectric side walls formed at first and second sides of the magnetic free layer.

15. The method as in claim 1, wherein the dielectric layer is deposited by ion beam deposition.

* * * * *

UNITED STATES PATENT AND TRADEMARK OFFICE
CERTIFICATE OF CORRECTION

Page 1 of 1

PATENT NO. : 8,615,868 B2
APPLICATION NO. : 13/306887
DATED : December 31, 2013
INVENTOR(S) : Ahn et al.

It is certified that error appears in the above-identified patent and that said Letters Patent is hereby corrected as shown below:

In the claims:

col. 6, line 34 replace "or" with --over--;

col. 6, line 35 replace "eight" with --height--;

col. 6, line 38 replace "non-magnetic magnetic" with --non-magnetic--.

Signed and Sealed this
Thirteenth Day of May, 2014

Michelle K. Lee
*Deputy Director of the United States Patent and Trademark Office*